Patented Jan. 6, 1931

1,787,888

UNITED STATES PATENT OFFICE

ARTHUR C. WHITE AND CHARLES E. CLASON, OF MIDLAND, MICHIGAN, ASSIGNORS TO THE DOW CHEMICAL COMPANY, OF MIDLAND, MICHIGAN, A CORPORATION OF MICHIGAN

ICE-ROTTING COMPOUND

No Drawing. Application filed February 8, 1928. Serial No. 252,935.

This invention relates to an ice rotting compound.

It is common practice to thaw ice on roads, streets, sidewalks, ship lanes, channels, cleavage lines and other places by spreading thereon a quantity of ice rotting or thawing material, such as certain salts. However, where the ice surface to be thawed is extensive a large amount of the material is required, which naturally involves considerable expense.

The object of the present invention is to provide an ice rotting compound which is readily handled, comparatively cheap and easy to manufacture, and which materially lessens the cost of the ice rotting process as the amount of handling necessary in applying the compound is much less than would be required were an ice rotting substance and a heat absorbing material separately applied.

Other objects and advantages will become apparent as the detailed description proceeds.

The invention may be said to involve first, broadly, a compound comprising a mixture of a substance which will melt ice and a substance which will absorb heat, and, secondly, the more specific compounds of such nature as are hereinafter set forth.

Among the materials having ice rotting or thawing properties, salt, calcium chloride or similar materials have been most commonly used for destroying ice or slush upon roads, sidewalks, streets, and other places. It has, however, taken a large amount of the material for a given surface of ice, thus increasing the cost and rendering more difficult the handling and application of the material. The present invention proposes to augment the ice thawing action of the material by adding thereto a material which will absorb the radiant heat of the sun. The heat absorbing material should be of such a nature that a minute amount is required in relation to the quantity of thawing or rotting material.

The compound may be formed of various ingredients having the desired characteristics. As to the ice rotting or thawing material which may be used in the mixture, common salt is effective. However, calcium chloride is much better fitted for the purpose as its heat of solution is greater. Another suitable ice rotting or thawing material which may be used is magnesium chloride which is available in crystallized form with six molecules of water, or which may be dried to a content of but four or less molecules of water if necessary. Magnesium chloride also has a heat of solution greater than that of ordinary salt.

The calcium chloride and the magnesium chloride may be obtained cheaply from natural brines after the extraction of the salt therefrom. Large amounts of mixed magnesium and calcium chlorides, having a varying anhydrous content depending upon the proportion in which they are present, may be produced from the mother liquors. The evaporation of such mother liquors in the open results in the obtainance of a product in which calcium chloride is present with two molecules of water and the magnesium chloride with six. The product may then be cooled, solidified and granulated, or flaked or powdered for convenient use.

The heat absorbing material may be any dark pigment, preferably one which is cheap and an efficient absorber of heat. Among such materials the most advantageous ones for this use are lamp black, powdered charcoal, coal dust, coke dust, iron oxides or natural ores of iron and the like. Since lamp black has the advantage of its low weight per unit absorbing power, as well as its low cost per ton of the compound, it is the most preferable of all the materials mentioned.

The materials may be mixed in various ways depending upon conditions. The lamp black or other pigment may be simply mixed with the granulated, flaked, or powdered calcium or magnesium chloride or it may be mixed in with the fused salt before it is solidified by cooling.

In carrying on the mixture of the materials in whatever fashion, it is only necessary to compound with the salt a sufficient amount of the pigment to give the resulting mixture a dark color. As for example, it only requires the addition of .24 of 1% by weight of lamp black to flaked calcium chloride to produce a compound having greatly increased ability for absorbing the heat rays of the sun, such compound weighing very little more than the weight of the calcium chloride. Of course, varying amounts of the lamp black or other pigment may be used if desired, but it is not necessary for satisfactory results.

The materials should be placed in an agitating or similar mixing device so that the compound will have the salt and the heat absorbing material uniformly mixed.

Although certain ice thawing or rotting materials, heat absorbing materials and the manner and proportions in which they are compounded have been specifically set forth, it should be understood that the invention is not limited thereto, except in so far as the scope of the appended claims so limits it.

Having thus described our invention, what we claim is:

1. An ice rotting compound comprising an ice rotting material and a heat absorbing material.
2. An ice rotting compound comprising a comminuted ice rotting material and a powdered heat absorbing material.
3. An ice rotting compound comprising a mechanical mixture of an ice melting mineral salt with a heat absorbing pigment.
4. An ice rotting compound comprising a mechanical mixture containing a chloride of an alkaline earth metal and a radiant heat absorbing pigment.
5. An ice rotting compound comprising a mixture of solid chlorides of the alkaline earth metals and a radiant heat absorbing pigment.
6. An ice rotting compound comprising a mechanical mixture of calcium chloride and a heat absorbing pigment.
7. An ice rotting compound comprising comminuted calcium chloride and a radiant heat absorbing pigment.
8. An ice rotting compound comprising calcium chloride having an anhydrous content in excess of 75%, and a radiant heat absorbing pigment.
9. An ice rotting compound comprising an ice rotting material and lamp black.
10. An ice rotting compound comprising a mineral salt and lamp black.
11. An ice rotting compound comprising calcium chloride and lamp black.
12. An ice rotting composition comprising an ice rotting substance mechanically mixed with a coloring material to render the substance of a dark color.
13. A method of producing an ice rotting composition comprising darkly coloring an ice rotting substance prior to its application to the ice.
14. A method of producing an ice rotting composition comprising coloring an ice melting salt to a heat retaining color prior to its application to the ice.

In testimony whereof, we hereunto affix our signatures.

ARTHUR C. WHITE.
CHARLES E. CLASON.